United States Patent [19]

Ostrup et al.

[11] Patent Number: 4,759,173
[45] Date of Patent: Jul. 26, 1988

[54] SELF-PROPELLING AGRICULTURAL MACHINE

[75] Inventors: Heinrich Ostrup, Harsewinkel; Karl Rupprecht, Hilter; Günter Eis, Harsewinkel, all of Fed. Rep. of Germany

[73] Assignee: Claas Ohg, Harsewinkel, Fed. Rep. of Germany

[21] Appl. No.: 877,430

[22] Filed: Jun. 23, 1986

[30] Foreign Application Priority Data

Jun. 25, 1985 [DE] Fed. Rep. of Germany ....... 3522699

[51] Int. Cl.$^4$ ............................................ A01D 67/00
[52] U.S. Cl. ........................................ 56/208; 56/209; 172/668
[58] Field of Search ............... 56/15.6, 15.8, 16.2, 56/208, 209, 210; 172/663, 667, 668

[56] References Cited

U.S. PATENT DOCUMENTS 4,313,294  2/1982  Martenas .................... 56/208 X
4,527,381  7/1985  Mann ........................... 56/209
4,565,056  1/1986  Heidjann ................... 56/15.8 X

FOREIGN PATENT DOCUMENTS 1168149  4/1964  Fed. Rep. of Germany ........ 56/208

Primary Examiner—George A. Suchfield
Assistant Examiner—John F. Letchford
Attorney, Agent, or Firm—Michael J. Striker

[57] ABSTRACT

A self-propelling agricultural machine, particularly a harvester thresher, comprises a machine unit provided with supporting elements, a front working implement turnable transversely to a traveling direction and having upper receiving elements for the supporting elements, and lower locking elements, and cylinder-piston units each having a cylinder and a piston with a piston rod having a free end, the supporting elements being mounted on the free ends of the piston rods of the cylinder-piston units, while the cylinders being connected with the machine unit.

5 Claims, 2 Drawing Sheets

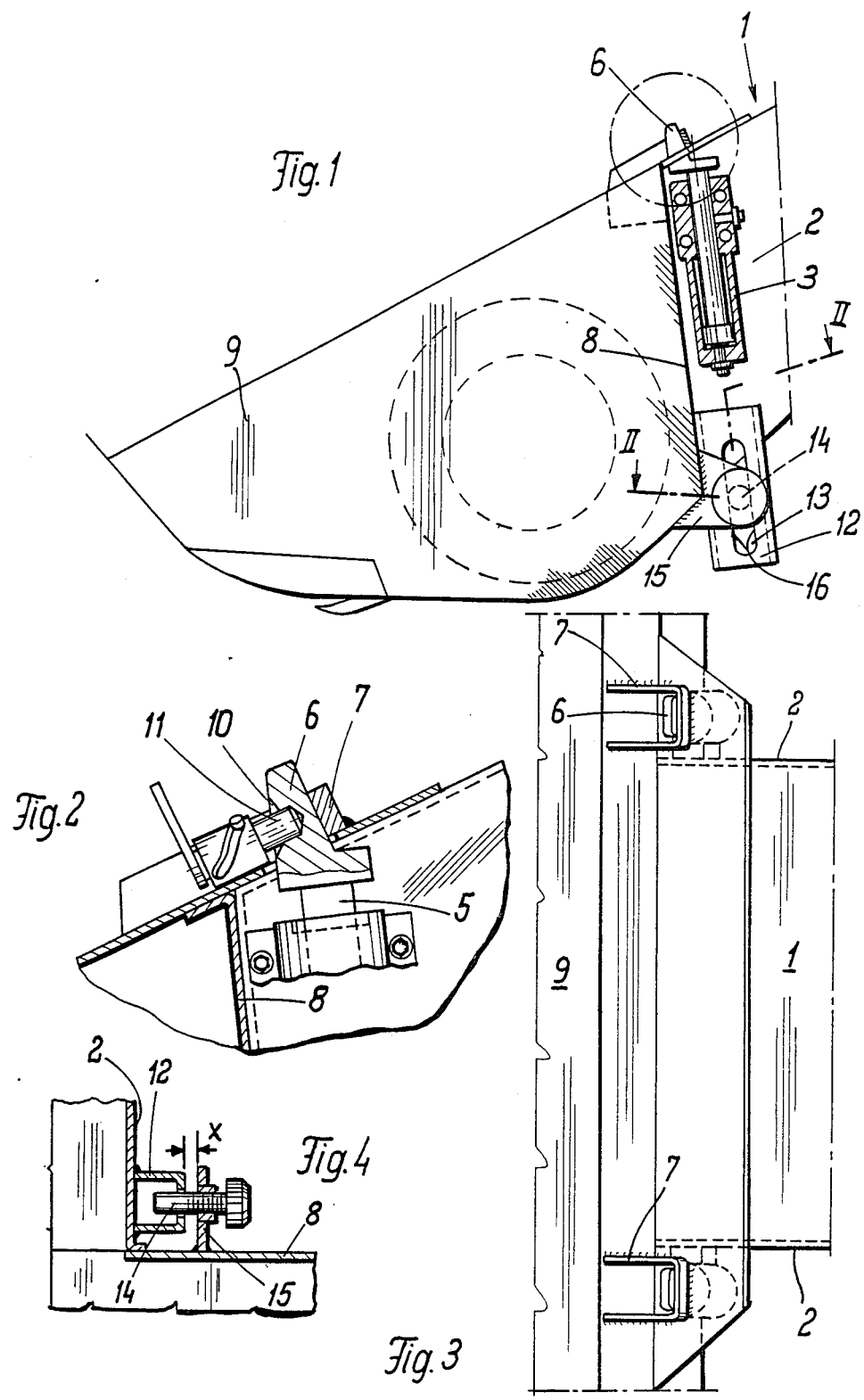

SELF-PROPELLING AGRICULTURAL MACHINE

BACKGROUND OF THE INVENTION

The present invention relates to a self-propelling agricultural machine, and particularly a harvester thresher with a working device such as a cutting table mounted in front of the machine and turnable transversely to a traveling direction. More particularly, it relates to such a self-propelling agricultural machine in which the working device has upper receiving openings for supporting pins connected with the machine unit and also has lower locking elements.

Modern harvester threshers are provided with extra wide cutting mechanisms for a high throughput. The cutting mechanisms are connected via fast couplings with the harvester thresher, so that for street transportation the cutting mechanism can be removed from the harvester thresher very fast. In addition to the fast couplings, devices must be provided by means of which the extra wide cutting mechanism can be turned relative to the harvester thresher so that the cutting mechanism substantially adjusts to the ground contour. Such a feature is provided in a harvester thresher disclosed in the German document DE-AS No. 2,133,746, which has an inclined transporting passage and a flange frame additionally mounted at its front end. Guiding rollers are connected with the flange frame and engage in guides which are connected with the cutting mechanism. Above and below the inclined conveyor, special locking devices are provided to guarantee a reliable connection of the inclined conveyor with the cutting mechanism. The central position of the cutting mechanism relative to the inclined conveyor is provided in this known harvester thresher by pressure springs which laterally engage the inclined conveyor. In addition to the disadvantage that the harvester thresher driver does not have any influence upon the inclined position of the cutting mechanism, a special disadvantage of this construction is that the turning device is very expensive and damage susceptible.

SUMMARY OF THE INVENTION

Accordingly, it is an object of the present invention to provide a self-propelling agicultural machine which avoids the disadvantages of the prior art.

More particularly, it is an object of the present invention to provide a self-propelling agricultural machine which is designed so that it satisfies the requirements in the sense of mounting of the working implement on the agricultural machine and in the sense of a simple turning of the working implement relative to the agricultural machine in a satisfactory manner.

In keeping with these objects and with others which will become apparent hereinafter, one feature of the present invention resides, briefly stated, in that supporting means are mounted on free ends of piston rods of cylinder-piston units, and associated cylinders are connected with the machine unit.

When the agricultural machine is designed in the above described manner, it is simple and robust in its construction and also corresponds to the requirements of harvesting agricultural products.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a side view of a cutting mechanism suspended on an inclined conveyor in a self-propelling agricultural machine in accordance with the present invention;

FIG. 2 is a view showing a part of the inventive machine which is encircled in a broken line in FIG. 1, on an enlarged scale;

FIG. 3 is a plan view of the part of the agricultural machine which is encircled in FIG. 1 in broken line;

FIG. 4 is view showing a section taken along the line IV—IV in FIG. 1; and

DESCRIPTION OF A PREFERRED EMBODIMENT

Figure 5:
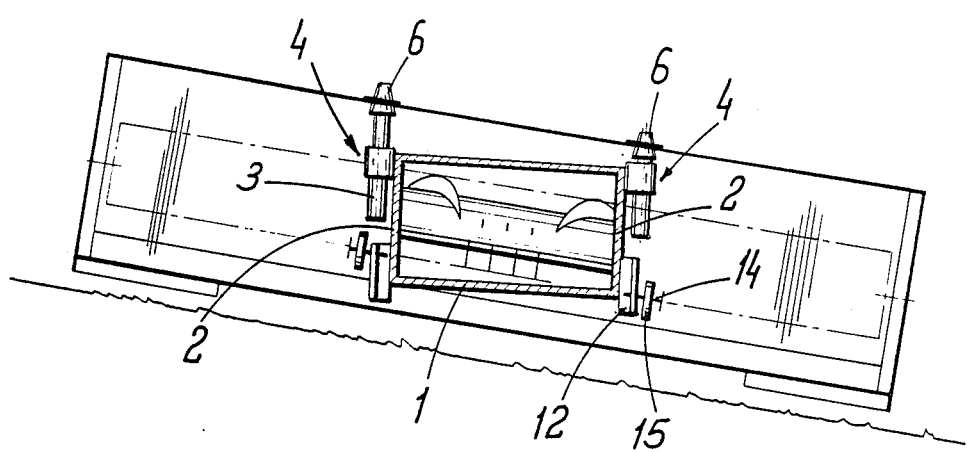
FIG. 5 is a front view of a cutting mechanism in an inclined position of the inventive agricultural machine.

A not shown self-propelling harvester thresher has an inclined conveyor with a front part which is identified with reference numeral 1 and has side walls 2. Cylinders 3 of a hydraulic cylinder-piston units 4 are fixedly connected with the side walls 2 of the front part 1 of the inclined conveyor. Piston rods of the cylinder-piston units 4 are identified with reference numeral 5.

Supporting pins 6 are mounted on the piston rods 5, and more particularly on their free ends which extend outwardly beyond the cylinders of the cylinder-piston units 4. Brackets 7 embrace the supporting pins 6 with a lateral play. The brackets 7 are welded with a rear wall of a cutting mechanism 9. When the inclined conveyor 1 is lifted in a known manner, the cutting mechanism 9 is also lifted therewith as a result of the lifting the former. For preventing springing of the brackets 7 from the supporting pins 6 in the event of vibrations, the supporting pins 6 are provided with recesses 10, and locking elements 11 connected with the cutting mechanism 9 engage into the recesses 10.

Hollow profiles 12 are welded under the cylinderpiston unit 4 with the inclined conveyor 1 and provided with substantially vertically extending elongated openings 13. Free ends of pins 14 engage in the elongated openings 13. Each pin 14 has a thread. The pins 14 are screwed with their threads into consoles 15 which are fixedly connected with the cutting mechanism 9 at a lateral distance X from the hollow profiles 12.

For inclined positioning of the cutting mechanism 9, one of the two piston rods 5 [FIG. 5] is extended or both cylinder-piston units are simultaneously actuated in opposite directions. Since the brackets 7 embrace the supporting pins 6 with a play and a lateral play is provided within the consoles 15 and the hollow profiles 12, a clamping is prevented.

The actuation of the cylinder-piston units 4 can be performed automatically, for example by a sensor which senses the ground contour, or can be performed also manually. For adjustment of the cutting mechanism to the ground in a longitudinal direction in the event of flat terrain, the cylinderpiston units are actuated simultaneously. The cutting mechanism therefore is adjusted to the ground contour without displacement of the inclined conveyor as is conventional in the prior art. In addition, it is also possible to extend both piston rods 5 by different lengths, so that the cutting mechanism 9 is lifted and is simultaneously moved to an inclined position. The respective hydraulic circuitry is believed to be obvious and therefore not described in detail herein.

It will be understood that each of the elements described above, or two or more together, may also find a useful application in other types of constructions differing from the types described above.

While the invention has been illustrated and described as embodied in a self-propelling agricultural machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A self-propelling agricultural machine particularly a harvester thresher, comprising a machine unit provided with supporting means; a front working implement tiltable in a vertical plane transversely to a traveling direction and having upper receiving means for said supporting means; cylinder-piston units each having a cylinder and a piston with a piston rod having a free end, said supporting means being mounted on said free ends of said piston rods of said cylinder-piston units, while said cylinders being connected with said machine unit, so that upon extension or retraction of said piston rods said front working implement is tilted relative to said machine unit, said supporting means of said machine unit being formed as supporting pins, said receiving means of said working implement being formed as upper receiving openings, said supporting pins being engaged in said upper receiving openings and having each at least one opening; and a blocking element engageable in said opening of said supporting pin.

2. A self-propelling agricultural machine as defined in claim 1; further comprising two brackets connected with said working implement and each having a respective one of said receiving openings formed so that each of said receiving opening embraces a respective one of said supporting pins with a lateral play.

3. A self-propelling agricultural machine particularly a harvester thresher, comprising a machine unit provided with supporting means; a front working implement tiltable in a vertical plane transversely to a traveling direction and having upper receiving means for said supporting means; cylinder-piston units each having a cylinder and a piston with a piston rod having a free end, said supporting means being mounted on said free ends of said piston rods of said cylinder-piston units, while said cylinders being connected with said machine unit, so that upon extension or retraction of said pistons rods said front working implement is tilted relative to said machine unit, said supporting means of said machine unit being formed as supporting pins, said receiving means of said working implement being formed as upper receiving openings, said supporting pins being engaged in said upper receiving openings; and further comprising locking means associated with a respective one of said supporting pins and including a guiding surface provided in said machine unit and extending substantially vertically and a pin member connected with said working implement and guided on said guiding surface.

4. A self-propelling agricultural machine as defined in claim 3; and further comprising a hollow profiled member provided at each side of said machine unit and having an elongated opening, said pin member having a free end extending into said elongated opening.

5. A self-propelling agricultural machine as defined in claim 4; and further comprising mounting consoles each supporting a respective one of said pin members and arranged with a lateral distance from a respective one of said hollow profiled members.

* * * * *